(12) United States Patent
Meurer et al.

(10) Patent No.: US 11,068,373 B1
(45) Date of Patent: Jul. 20, 2021

(54) AUDIT LOGGING DATABASE SYSTEM AND USER INTERFACE

(71) Applicant: Palantir Technologies Inc., Palo Alto, CA (US)

(72) Inventors: Natalie Meurer, Washington, DC (US); Andrew Lampert, Melbourne (AU); Dyon Balding, Melbourne (AU); Yeong Wei Wee, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/450,623

(22) Filed: Jun. 24, 2019

Related U.S. Application Data

(60) Provisional application No. 62/805,811, filed on Feb. 14, 2019.

(51) Int. Cl.
  *G06F 15/16* (2006.01)
  *G06F 11/34* (2006.01)
  *G06F 3/0486* (2013.01)
  *G06F 17/18* (2006.01)

(52) U.S. Cl.
  CPC ........ *G06F 11/3438* (2013.01); *G06F 3/0486* (2013.01); *G06F 11/3476* (2013.01); *G06F 17/18* (2013.01)

(58) Field of Classification Search
  CPC ............... G06F 11/3438; G06F 3/0486; G06F 11/3476; G06F 17/18
  See application file for complete search history.

(56) References Cited

U.S. PATENT DOCUMENTS

| | | | |
|---|---|---|---|
| 2016/0344828 A1* | 11/2016 | Hausler | G06F 16/9535 |
| 2018/0173617 A1* | 6/2018 | Tian | G06F 9/451 |
| 2020/0019418 A1* | 1/2020 | P K et al. | G06K 9/00335 |

* cited by examiner

*Primary Examiner* — Normin Abedin
(74) *Attorney, Agent, or Firm* — Knobbe, Martens, Olson & Bear, LLP

(57) ABSTRACT

Systems and methods are provided for improved auditing of user actions associated with a software application. The system includes functionality to log user actions in a structured, standardized way. The system includes interactive user interfaces for analyzing the logs. The logging is based on a well-defined categorization of available actions. The log information includes (and distinguishes among) user details, context details, user inputs, and/or system outputs (including identification of data objects). The interactive user interfaces enable a user to view structured log data in an efficient manner, such as by presenting logs in a tabular format, executing queries on the log data, and/or presenting visualizations that summarize the log data. The interactive user interfaces provide functionality that allows a user to investigate and/or audit user interactions with a data object. A reviewer is permitted to drag and drop one or more data objects of interest from the software application directly into the interactive user interfaces. The interactive interfaces present log entries associated with the object(s) for further review by the reviewer.

13 Claims, 10 Drawing Sheets

Auditor — 420

| Table | Details | Reports |

Click here to search    [Filter]

| Timestamp | User | Event Category | Event Name | Context Type | Source | Input | Output |
|---|---|---|---|---|---|---|---|
| 09-Jan-2019 11:12:01 | bob1 | load | objectsLoaded | Investigation | 238.147.31.27 | | 9c9b31cfb94e... |
| 09-Jan-2019 19:14:02 | dave7 | search | searchObjects | Investigation | 31.74.173.93 | 48c9d813e8... | dd1fb4afca09... |
| 11-Jan-2019 12:37:13 | sarax | load | resourcesLoaded | DataManagement | 184.12.192.148 | | c5bc4a91483j... |
| 11-Jan-2019 14:37:44 | jane1 | load | objectsLoaded | Investigation | 102.46.72.218 | | 5881d9a09x1... |

— 422

Results 1-100 of 112

Auditor — 460

| Table | Details | Reports |

Grouped by User — 462

| User | Result Count |
|---|---|
| bob1 | 10 |
| dave7 | 14 |
| jane1 | 4 |
| sarax | 24 |

Results 1-10

FIG. 4C

AUDIT LOGGING DATABASE SYSTEM AND USER INTERFACE

INCORPORATION BY REFERENCE TO ANY PRIORITY APPLICATIONS

This application claims benefit of U.S. Provisional Patent Application Ser. No. 62/805,811 entitled "Audit Logging Database System and User Interface" filed Feb. 14, 2019, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

In the area of computer-based platforms, existing logging systems typically output text data that is specified by application developers. The text data for logging purposes may not follow a standard format. The log data can be very large and potentially too large for a human reviewer to manually read.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a method for audit logging user interactions is disclosed comprising: receiving user input regarding a user interaction with an application user interface; determining a first logging entry for the user interaction, the first logging entry comprising: a timestamp associated with the user interaction, a user identifier associated with the user interaction, a category type of the user interaction, an application context associated with the user interaction, the user input, and system output of the application user interface, the system output in response to the user input; storing the first logging entry in a structured format to a non-transitory computer storage medium; and causing the system output of the application user interface.

According to an aspect, the method may further comprise: retrieving, from the non-transitory computer storage medium, a plurality logging entries comprising the first logging entry; and causing presentation, in an audit logging user interface, of the plurality logging entries, wherein the presentation of the first logging entry comprises a visual representation of: the timestamp, user data associated with the user identifier, the category type of the user interaction, context data associated with the application context, the user input, and the system output.

According to another aspect, the method may further comprise: receiving a statistical measure; calculating a statistical indicator from at least some logging entries of the plurality logging entries according to the statistical measure; and causing presentation, in the audit logging user interface, of summary data comprising the statistical indicator.

According to yet another aspect, the first logging entry can comprise a first identifier, and wherein determining the first logging entry may further comprises: retrieving additional data for the first identifier; and adding the additional data to the first logging entry.

According to yet another aspect, the method may further comprise: receiving a first logging level for the application user interface; and determining that the first logging level corresponds to an enhanced logging level, wherein retrieving the additional data is in response to determining that the first logging level corresponds to the enhanced logging level.

According to yet another aspect, the system output can comprise a first data object.

According to yet another aspect, the system output can comprise a first resource.

According to yet another aspect, the method may further comprise: receiving second user input regarding a second user interaction with an investigation user interface; identifying the first data object based at least in part on the second user input; causing presentation, in the investigation user interface, of the first data object; receiving, by an audit logging user interface, a selection of the first data object from the investigation user interface; determining a second plurality of logging entries, wherein each logging entry of the second plurality of logging entries comprises at least a reference to the first data object, the second plurality of logging entries comprising the first logging entry; and causing presentation, in the audit logging user interface, of the second plurality of logging entries.

According to yet another aspect, the selection of the first data object can comprise a drag and drop user interaction from the investigation user interface to the audit logging user interface.

According to yet another aspect, the method may further comprise: causing presentation, in the audit logging user interface, of summary data regarding the second plurality of logging entries.

According to yet another aspect, the summary data can comprise a statistical measure regarding a number of users that interacted with the first data object.

According to another embodiment, a system is disclosed comprising: a non-transitory computer storage medium; and one or more computer hardware processors in communication with the non-transitory computer storage medium, the one or more computer hardware processors configured to execute the computer-executable instructions to at least: receive user input regarding a user interaction with an application; determine a first logging entry for the user interaction, the first logging entry comprising: a timestamp associated with the user interaction, a user identifier associated with the user interaction, a category type of the user interaction, an application context associated with the user interaction, the user input, and system output of the application user interface, the system output in response to the user input; store the first logging entry in a structured format to the non-transitory computer storage medium; and causing the system output of the application.

According to an aspect, the one or more computer hardware processors may be further configured to: retrieve, from the non-transitory computer storage medium, a plurality logging entries comprising the first logging entry; and cause presentation, in an audit logging user interface, of the plurality logging entries, wherein the presentation of the first logging entry comprises a visual representation of: the timestamp, user data associated with the user identifier, the category type of the user interaction, context data associated with the application context, the user input, and the system output.

According to another aspect, the one or more computer hardware processors may be further configured to: receive a statistical measure; calculate a statistical indicator from at least some logging entries of the plurality logging entries according to the statistical measure; and cause presentation, in the audit logging user interface, of summary data comprising the statistical indicator.

According to yet another aspect, the first logging entry can comprise a first identifier, and wherein to determine the first logging entry can further comprise: retrieve additional data for the first identifier; and add the additional data to the first logging entry.

According to yet another aspect, the one or more computer hardware processors may be further configured to: receive a first logging level for the application; and determine that the first logging level corresponds to an enhanced logging level, wherein retrieving the additional data is in response to determining that the first logging level corresponds to the enhanced logging level.

According to yet another aspect, the system output can comprise a first data object.

According to yet another aspect, the system output can comprise a first resource.

According to yet another aspect, the one or more computer hardware processors may be further configured to: receive second user input regarding a second user interaction with a second application; identify the first resource based at least in part on the second user input; receive, by an audit logging user interface, a selection of the first resource from the second application; determine a second plurality of logging entries, wherein each logging entry of the second plurality of logging entries comprises at least a reference to the first resource, the second plurality of logging entries comprising the first logging entry; and cause presentation, in the audit logging user interface, of the second plurality of logging entries.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an improved manner of auditing logging entries.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g., forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the aboveand/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 4A, 4B, 4C illustrate graphical user interfaces of an auditing workflow, according to some embodiments of the present disclosure.

DETAILED DESCRIPTION

Overview

Figure 1:
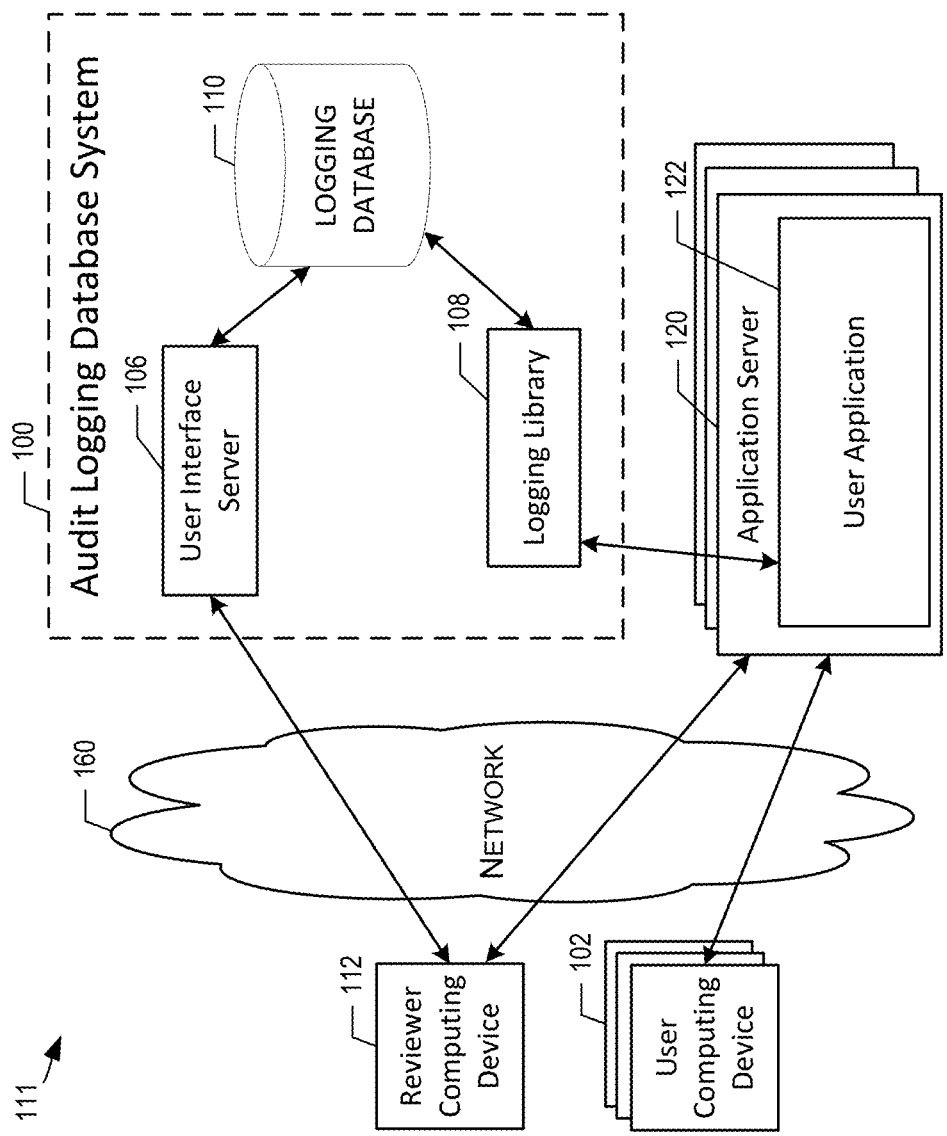
FIG. 1 illustrates an audit logging database system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Existing logging systems can output text data. The text data may be specified by application developers. The text data may not follow a standard format. The log data can be large. A human reviewer can manually read through the logs. Further, some existing log review systems enable a reviewer to perform a textual search through the logs. In many contexts, such as a security-sensitive context, if a reviewer, such as an auditor, is required to review logs in a manual manner or via textual searching, such an approach would simply be too slow and/or cumbersome for the reviewer's needs. A log reviewer may have many questions, queries, and/or requests that cannot be solved in an efficient manner or that cannot be solved by existing systems, such as the following questions: How has a user interacted with an application in a certain time frame? Which logs are associated with certain records or data objects? What are certain analytics associated with certain actions? For example, what is the frequency of logs associated with certain actions?

Disclosed herein are systems and methods that may be used to advantageously improve auditing user actions associated with a software application. The system can include functionality to log user actions in a structured, standardized way. The system can also include interactive user interfaces for analyzing the logs. The logging can be based on a well-defined categorization of all available actions. The log information can include (and distinguishes among) user details, context details, user inputs, and/or system outputs (including identification of data objects). The interactive user interfaces can enable a user to view structured log data in an efficient manner, such as by presenting logs in a tabular format, executing queries on the log data, and/or presenting visualizations that summarize the log data. The interactive user interfaces can also provide functionality that allows a user to investigate and/or audit user interactions with a data object. For example, a reviewer can drag and drop one or more data objects of interest from the software application directly into the interactive user interfaces, which can cause the interactive user interfaces to surface information related to the object(s). For example, the interactive interfaces can present log entries associated with the object(s) for further review by the reviewer.

As mentioned above, existing logging systems can have deficiencies. For example, existing logging systems may use text data, which may not follow a standard format, log data can large, and existing logging systems can have limited search capabilities, such as a simple text search function in a text log. If a reviewer wants to investigate an issue, the reviewer may have to manually search through very large log files, which may be extremely slow or impossible to complete. Thus, it can be slow, inaccurate, and/or cumbersome for a human reviewer to review log data via existing logging systems. For example, a reviewer may have to testify or certify that a user has or has not performed some action or has or has not accessed some object with a high degree of confidence.

Accordingly, the systems and techniques described herein may improve computer auditing or logging technology and/or graphical user interfaces. Instead of existing logging systems with a limited logging format, an improved audit logging database system can include a method for storing log data in a structured format. The systems and techniques described herein may also improve the efficiency of storing some log data. The audit logging user interfaces can allow analysts to quickly, efficiently, or more accurately access or navigate through log data, which can result in an improved graphical user interface. The systems and techniques described herein can enable users to access log data faster, perform analyses faster, and/or interact with one or more user interfaces faster than existing systems (such as by reducing the number of clicks or selections by a user). Thus, the systems and techniques described herein can improve computer technology and/or graphical user interfaces.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). As used herein, a data source may refer to a table in a relational database, for example.

Database: Any data structure (and/or combinations of multiple data structures) for storing and/or organizing data, including, but not limited to, JavaScript Object Notation (JSON) files, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database," "table," and "data source" may be used interchangeably in the present disclosure.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Resource: Any type of data item, which can include a file, a data set, a document, or a data object. A resource can be identifiable by a resource identifier.

Example Audit Logging Database System Overview

FIG. 1 illustrates an audit logging database system 100, according to some embodiments of the present disclosure. In the embodiment of FIG. 1, the computing environment 111 can include a network 160, an audit logging database system 100, a user computing device 102, a reviewer computing device 112, and an application server 120. Various communications between these devices are illustrated. For example, the user computing device 102 may send user input, such as user selections or search parameters, to the application server 120. Logging data corresponding to the user input may be stored via the audit logging database system 100. In some embodiments, the user computing device 102 can store logging data (such as by storing the logging data to a local data store of the user computing device 102), which can later be transferred to the audit logging database system 100. The reviewer computing device 112, which may be similar to the user computing device 102, may send user input, such as user selections or search parameters, to the audit logging database system 100. The reviewer computing device 112 may enable a user to interact with a graphical user interface, such as the graphical user interfaces 200, 300, 400, 420, 460, and 500 of FIGS. 2, 3, 4A, 4B, 4C, and 5, respectively.

The application server(s) 120 can include one or more user applications 122. The user application 122 can include one or more graphical user interfaces, such as an application user interface. As described above, the user computing device 102 may send user input to the application server 120. In some embodiments, the user application 122 can execute on the user computing device 102 and the user input can be sent to the user application 122. One or more events, which can include user interactions, can be logged by the user application 122 via the audit logging database system 122. While the logging library 108 is shown as part of the audit logging database system, the logging library 108 can be included in the application server 120 and/or the user application 122. The logging library 108 can cause the events to be logged by the audit logging database system 100, such as by being stored in the logging database 110. As mentioned above, the user computing device 102 can locally store logging data to a data store of the user computing device 102, which can later be transferred to the logging database 110. An event can be stored in the logging database 110 as a logging entry, which can include, but is not limited to, a timestamp associated with the user interaction, a user identifier associated with the user interaction, a category type of the user interaction, an application context associated with the user interaction, the corresponding user input, and system output of a user application. As described herein, the logging entry can be stored in a structured format, such as JSON, which can enable efficient parsing and/or presentation by an auditor user interface.

The audit logging database system 100 can include a user interface server 106, the logging library 108, and a logging database 110. The user interface server 106 can cause presentation of a graphical user interface, as described herein. The user interface server 106 can receive user interaction data from the reviewer computing device 102. In response to receiving the user interaction data, the user interface server 106 can query the logging database 110 to retrieve logging related data. The user interface server 106 can generate a graphical user interface based on some of the user interaction data and/or the data in the logging database 110. In some embodiments, a reviewer can interact with respective graphical user interfaces of the user application and the user interface server 106. For example, a user can interact with one or more resources, such as data objects, via the user application and provide the selected resources to the user interface server 106 to retrieve logging data associated with the one or more resources.

Example Graphical User Interfaces

FIGS. 2, 3, 4A, 4B, 4C, and 5 illustrate example user interfaces, according to some embodiments of the present disclosure. In particular, FIGS. 2, 3, 4B, 4C, and 5 illustrate example user interfaces of the audit logging database system 100 described above with respect to FIG. 1. In various embodiments, aspects of the user interfaces may be rearranged from what is shown and described below, and/or particular aspects may or may not be included. However, the embodiments described below in reference to FIGS. 2, 3, 4A, 4B, 4C, and 5 provide example user interfaces of an audit logging database system. The user interfaces of FIGS. 2, 3, 4B, 4C, and/or 5 such as the user interfaces 200, 300, 420, 460, and/or 500 may have some similar user interface elements and/or capabilities. The graphical user interfaces of FIGS. 2, 3, 4A, 4B, 4C, and 5 can depict portions of a workflow where a reviewer, such as an auditor, can review and/or investigate logged user interactions.

Figure 2:
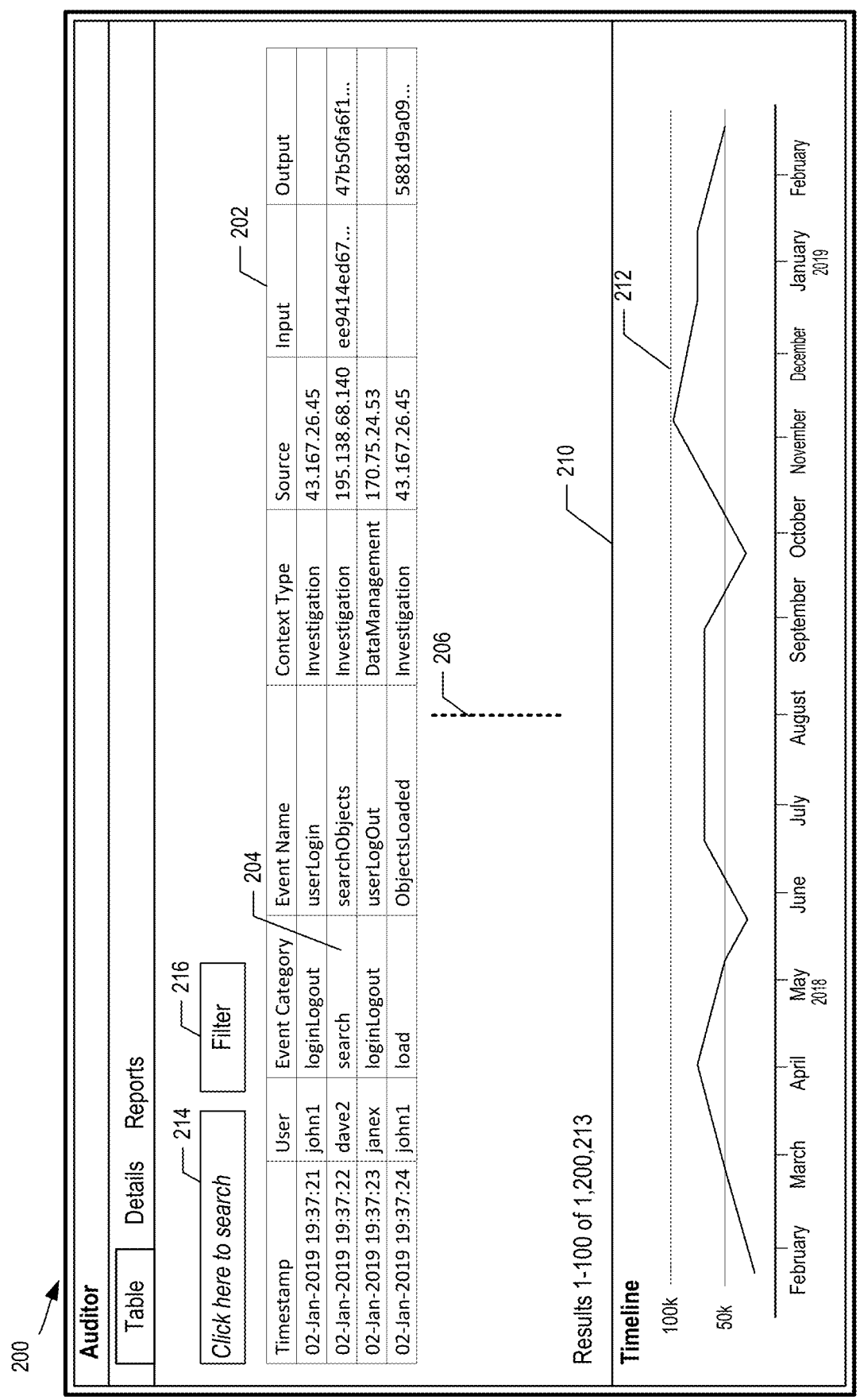
FIG. 2 illustrates a graphical user interface of an audit logging database system, according to some embodiments of the present disclosure.

FIG. 2 illustrates a graphical user interface 200 of an audit logging database system, according to some embodiments of the present disclosure. The graphical user interface 200 can be or include an auditing logging user interface. The graphical user interface 200 can include a first user interface area 202 that presents a set of logging entries. The logging entries can be from one or more data sources and/or user applications. A data source can be changed that can cause the graphical user interface 200 to update with some different logging entries corresponding to the updated data source. Each logging entry can include logging related data. For example, a logging entry 204 can include, but is not limited to, a timestamp associated with an event (such as a user interaction), a user identifier associated with the event (such as the username "dave2"), a category type of the event (such as the event category "search"), an event name (such as "searchObjects"), an application context associated with the event (such as the "Investigation" context that can refer to a type of user application for conducting investigation, as described herein), user input (shown here as a portion of an identifier "ee9414ed67 . . ."), and system output that can indicate output associated with the event (shown here as a portion of another identifier "47b50fa6f1 . . ."). A logging entry can store additional fields and/or values other than what is shown in FIG. 2. In addition to what is shown, many more logging entries can be presented in the first user interface area 202 as indicated by the ellipsis 206.

The graphical user interface 200 can include a second user interface area 210 that presents logging analytics. The example visualization 212 can include a timeline indicating a quantity of logging entries at particular points in time. In some embodiments, the graphical user interface 200 can receive a filter or search parameters that causes the selected logging entries to update, which can further cause the visualization 212 to dynamically update.

The graphical user interface 200 can include a search element 214 and/or a filter element 216. The search element 214 and/or a filter element 216 can enable a user to conduct an audit by reviewing events, such as user interactions, of users. Since the logging entries can be quite large, identifying a subset of logging entries may be useful for a reviewer to conduct an audit. The search element 214 can allow a user, such as a reviewer, to submit keyword(s) to identify a subset of logging entries to present to a user. The keyword(s) can be compared to textual data in the logging entry. The keyword(s) can be applied to the structured fields within the logging entries themselves, such as the "username" field. The filter element 216 can provide filtering controls and/or logic that can be applied to the structured data of the logging entry. For example, a set of logging entries can be filtered where numerical values within a particular field of the logging entry satisfies some criteria (such as by being within a range or equal to some value). Additional example filtering can also include identifying a subset of logging entries from particular users, computing devices, user applications, or other identifying information. Additional example filtering can also include identifying a subset of logging entries that relate to particular resource(s), such as data objects. Additional example filtering can also include identifying a subset of logging entries that occurred within a particular time period, such as on a certain day or within a certain hour, for example.

Figure 3:
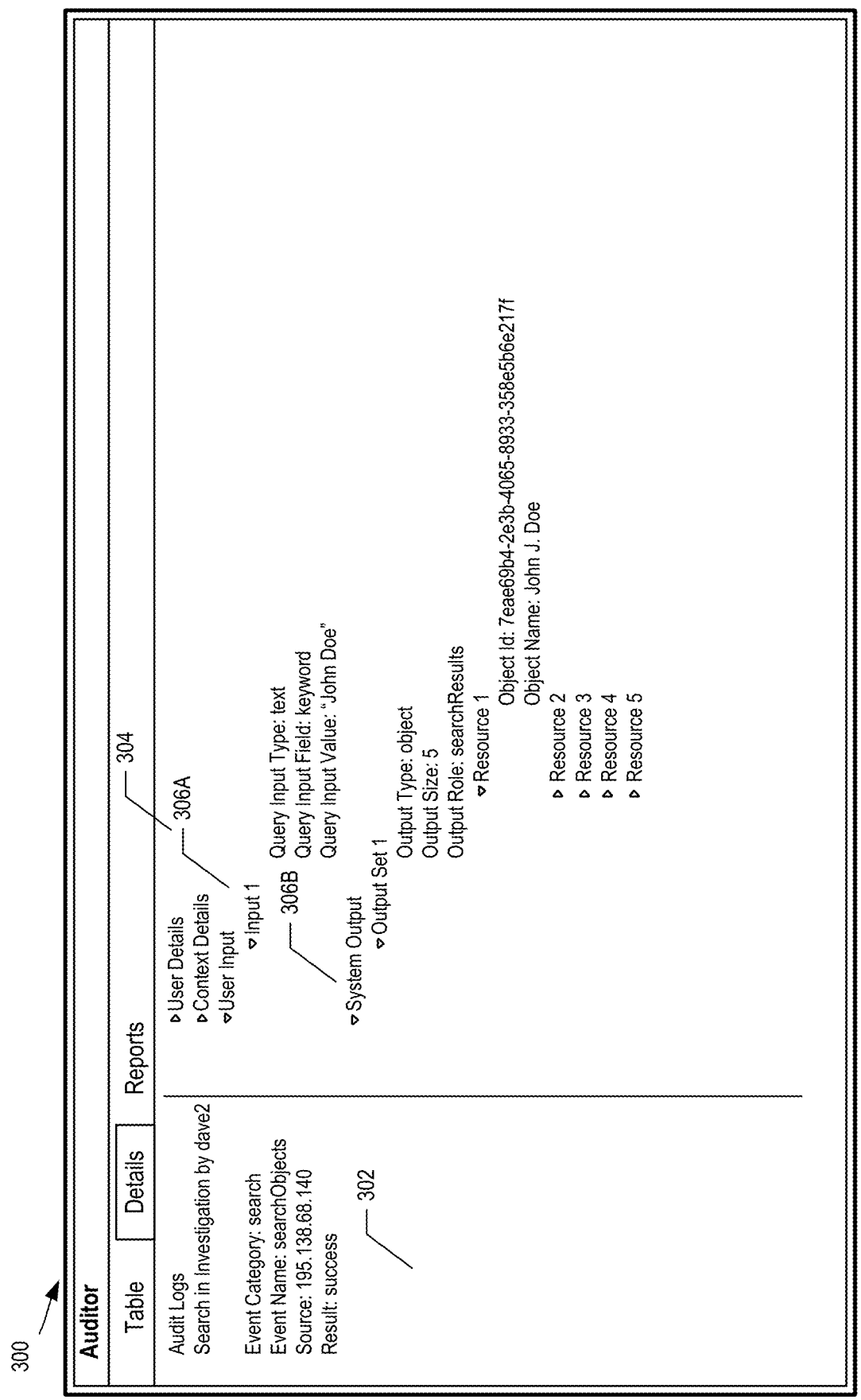
FIG. 3 illustrates another graphical user interface of an audit logging database system, according to some embodiments of the present disclosure.

FIG. 3 illustrates another graphical user interface 300 of an audit logging database system, according to some embodiments of the present disclosure. The graphical user interface 300 can be or include an auditing logging detail user interface. The graphical user interface 300 of FIG. 3 can be presented in response to a user selection of the graphical user interface 200 of FIG. 2, such as a user selection of the logging entry 204 of FIG. 2. Accordingly, the graphical user interface 300 of FIG. 3 can present details associated with the logging entry 204 of FIG. 2.

The graphical user interface 300 can include a summary user interface area 302, which can correspond to the details shown for the logging entry 204 of FIG. 2. The graphical user interface 300 can also include a breakdown user interface area 304. The breakdown user interface area 304 can depict a finer level of detail associated with the event, such as the user interaction here. For example, the hierarchical structure of the breakdown for the event includes an input breakdown 306A and a system output breakdown 306B. As shown, each of the input breakdown 306A and the system output breakdown 306B can visually explode into additional information for the review, such as input query details, and output data types and/or identifiers. The details for the logging entry in the breakdown user interface area 304 can correspond to a structured format for the logging entry, such as JSON.

Figure 4A:
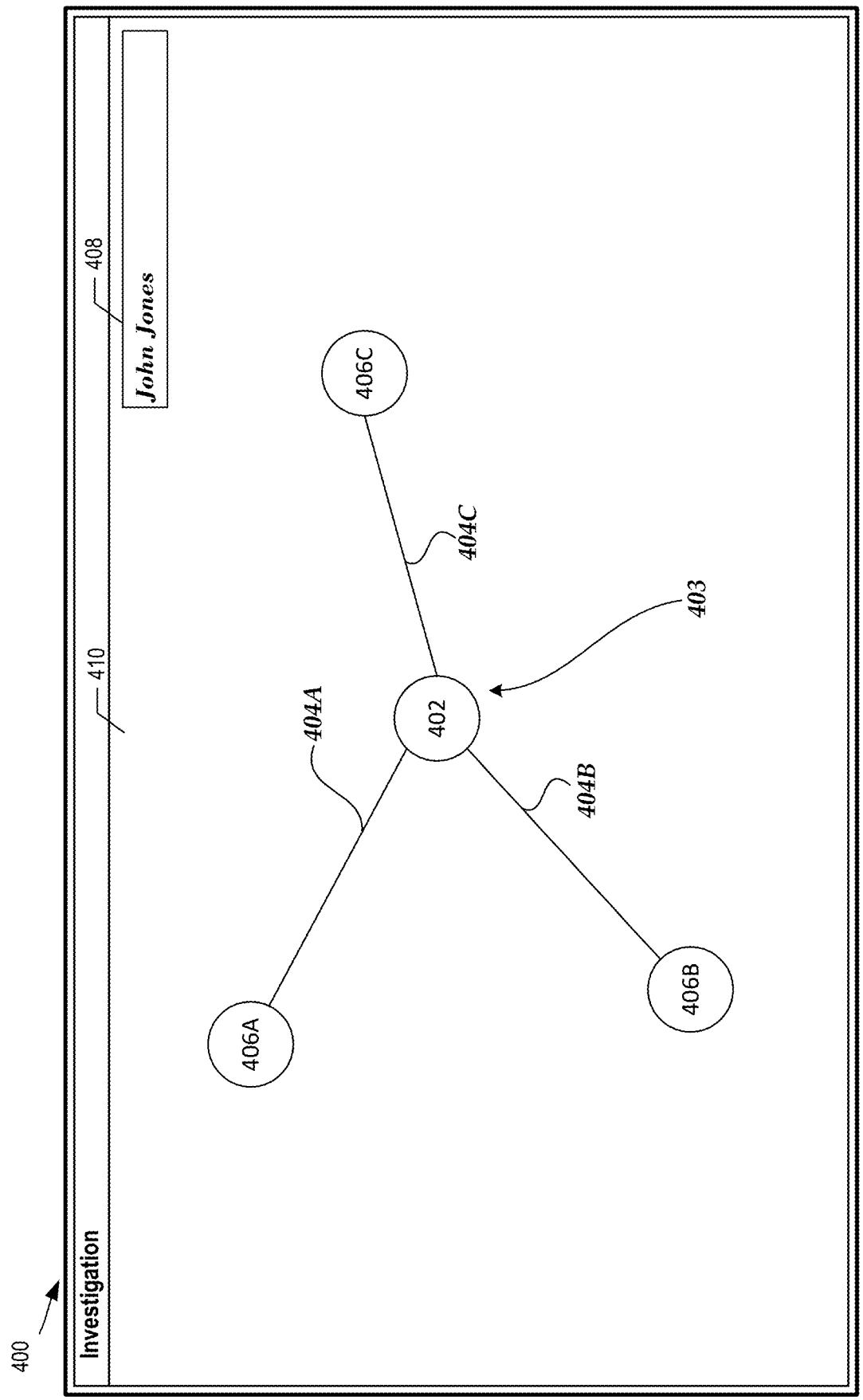

FIGS. 4A, 4B, and 4C illustrate graphical user interfaces 400, 420, 460 of an auditing workflow, according to some embodiments of the present disclosure. The auditing process depicted in FIGS. 4A, 4B, and 4C can illustrate an inverted auditing workflow that can begin with identifying one or more resources, such as data objects, in a user application. The identified one or more resources can then be audited in an audit logging user interface such that logs associated with the identified resources can be analyzed by a reviewer. As described below, a review can drag and drop one or more identified resources from the user application into the audit logging user interface.

FIG. 4A depicts an example graphical user interface 400 for a user application. The user application can be used for conducting investigations. The graphical user interface 400 can be an investigation user interface. While the example user application is an investigation application, the inverted auditing workflow can be applied to any user application that can identify one or more resources.

The graphical user interface 400 a search element 408 and an object display area 410. A reviewer can submit user input (here "John Jones") with the search element 408 to retrieve one or more objects 402, 406A, 406B, 406C. The object display area 410 can present a graph representation 403 of relationships (such as the links 404A, 404B, 404C) between the data objects (including data objects 402, 406A, 406B, 406C) that are represented as nodes in the example of FIG. 4A. The objects 402, 406A, 406B, 406C and links 404A, 404B, 404C can be a part of an ontology, as described herein. The objects 402, 406A, 406B, 406C can be person data objects. However, in other embodiments, the objects 402, 406A, 406B, 406C can be other types of objects.

In FIG. 4A, a relationship 404A can be based on, for example, a payment associated with the individuals indicated in the person data objects 402 and 406A. The first link 404A can represent a payment between the first person 402 and a second person 406A. In another example, the relationship between person data objects 402 and 406B as indicated by the second link 404B can indicate a shared flight. As another example, person data objects 402 and 406C can have a common address as indicated by the third link 404C.

As described herein, the graphical user interface 400 of a user application can be used by analysts. The user interactions of the users with the user application can be logged by the audit logging database system 100, which can identify the resources that were accessed by or otherwise interacted with by one or more users. A reviewer (that may review the activities of the users, such as during an audit) can leverage the user application to also identify one or more resources for audit logging purposes. In particular, the graphical user interface 400 can include an investigation user interface for an investigation application. As described above, a reviewer can submit user input, here "John Jones," which can cause the data object 402 to be retrieved that represents "John Jones." A subsequent user interaction can cause the objects 406A, 406B, 406C to be retrieved that have an association with the "John Jones" data object 402.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within a database may be searched using the search element 408 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise obscure relationships and patterns between different data objects, which can include retrieving audit logging data associated with one or more resources. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

FIG. 4B illustrates another graphical user interface 420 of an audit logging database system, according to some embodiments of the present disclosure. The auditing logging user interface 420 can be similar to the audit logging user interface 200 described above with respect to FIG. 2. The graphical user interface 420 of FIG. 4B can depict another step in the auditing workflow. From the user interface 400 of a user application of FIG. 4A, a reviewer can select one or more resources, such as data objects, that can be provided to the graphical user interface 420 of FIG. 4B. For example, a user can drag and drop one or more data objects 402, 406A, 406B, 406C from the user interface 400 of FIG. 4A to the auditing logging user interface 420 of FIG. 4B.

In response to the user selection, the auditing logging user interface 420 of FIG. 4B can retrieve logging entries associated with the selected resource(s). In some embodiments, the auditing logging user interface 420 can retrieve logging entries based on identifiers (such as a logging entry that has a system output with an identifier that matches an identifier of a selected resource, such as a particular object identifier) and/or based on a name of the resource (such as a file name, object name, or name of a person) that corresponds to a name referenced by a logging entry. The graphical user interface 420 can include a first user interface area 422 that presents a set of logging entries for the selected resource(s). The logging entries can indicate one or more user interactions with the selected resource(s), such as, but not limited to, objects loaded, objects searched, resources loaded, or resources searched.

FIG. 4C illustrates another graphical user interface 460 of an audit logging database system, according to some embodiments of the present disclosure. The graphical user interface 460 of FIG. 4C can depict another step in the auditing workflow, such as an analytics step. The graphical user interface 460 can include summary data 462. As described herein, an advantage of the structured data format of the logging entries is the ability to perform analytics on the logging entries.

The graphical user interface 460 of FIG. 4C can present an alternative view of the same data from the graphical user interface 420 of FIG. 4B. The summary data 462 can be a summary of the logging entries from the graphical user interface 420 of FIG. 4B. For example, a reviewer can select user interface elements to present statistical measures of the logging entries. As shown, the logging entries associated with the selected resources have been grouped by user. Thus, a review can view analytics about the logging entries associated with the selected resources. In particular, the reviewer can view how many times each user has interacted with one of the selected resources.

While the workflow has been described with respect to user interactions with the user interfaces of FIGS. 4A, 4B, and 4C in that order, the workflow can be performed in other directions. For example, a reviewer can view logging entries in the audit logging user interface, select one or more resources from the logging entries, and then view the resources in a respective user application. Thus, example workflows can include a reviewer going from a user application to an audit logging user interface and vice versa.

Figure 5:
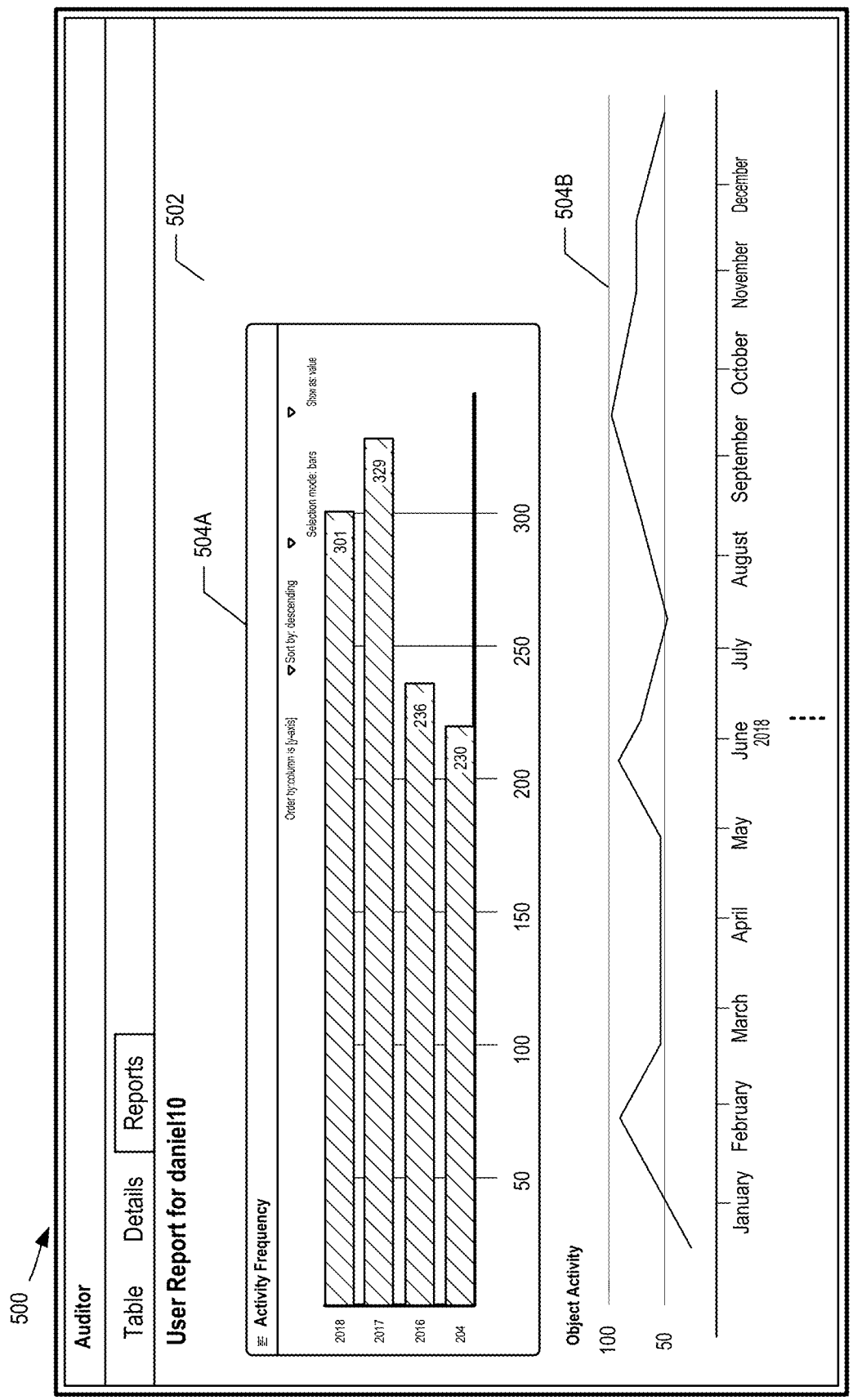
FIG. 5 illustrates a reports graphical user interface of an audit logging database system, according to some embodiments of the present disclosure.

FIG. 5 illustrates a reports graphical user interface 500 of an audit logging database system, according to some embodiments of the present disclosure. The graphical user interface 500 can include a report 502. The example report 502 can be a user report. The report 502 can include first and second summary data 504A, 504B. Again, the graphical user interface 500 can present improved audit logging user interfaces that present perform analytics on the logging entries, which can be based on the structured data format of the logging entries.

The user report can present analytics based on logging entries for a particular user. The first summary data 504A can depict activity frequency data for a user. Example activity data includes how often a user interacts with one or more applications, such as how many user logins to a particular application. The second summary data 504B can depict object activity data for a user. Example object activity data includes data regarding how many objects a user interacts over a period time. While not shown, additional example user-centric logging analytics can include, but are not limited to, search or query activity (such as how often does a user submit searches or queries), investigation activity (such as how often does a user conduct investigations), top used services, top searches, top objects, top importing activity by a user, and/or top exporting activity by a user.

Other example reports can include a trends report or an object report. The example trends report can include an overview of activity (such as unique users, total logins, failed logins, total search, total imports, total exports, login activity, etc.) for multiple users and/or multiple applications. The example trends report can include similar analytics to the user report 502, except that the analytics can be for multiple users.

Example activity data on the trends report can include how often users interact with one or more applications. Example object activity data on the trends report can include data regarding how many objects users are interacting with over a period time. Additional example logging analytics for a trends report can include, but are not limited to, search or query activity (such as how often are users submitting searches or queries), investigation activity (such as how often are users conducting investigations), top searches, top objects, top used services, top importing activity by users, and/or top exporting activity users.

The object report can be object-centric, such as by focusing on a particular object. Example activity data on the object report can include how often users interact with a particular object. Additional example logging analytics for an object report can include, but are not limited to, search or query activity (such as how often are users submitting searches or queries for the object), investigation activity (such as how often are users conducting investigations on the object), top searches for the object, and/or top used services for the object.

Example Audit Logging

Figure 6:
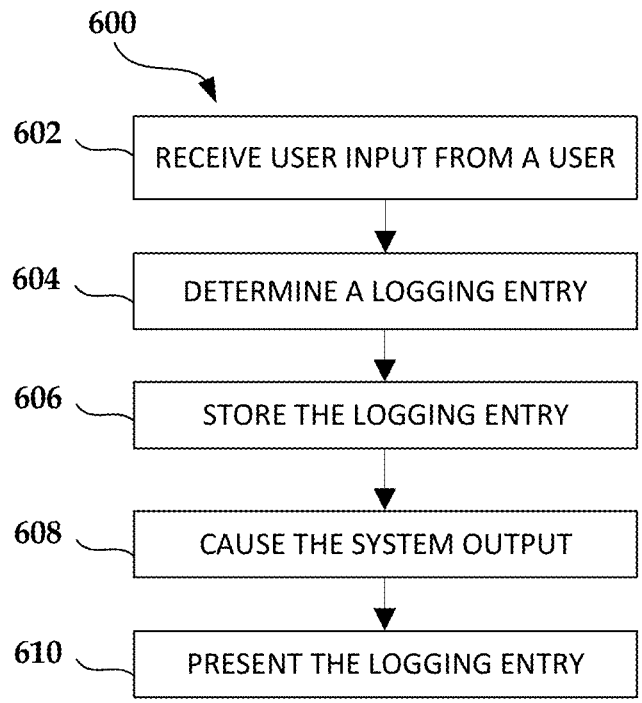
FIG. 6 is a flowchart of an example method for logging, according to some embodiments of the present disclosure.

FIG. 6 is a flowchart of an example method 600 for logging, according to some embodiments of the present disclosure. Although the method 600 is described in conjunction with the systems of FIG. 1, any system configured to perform the method, in any order, is within the scope of this disclosure. The method 600 may be performed by the various components of the application server 120 or the audit logging database system 100 of FIG. 1 as discussed herein, including the user application 122, the user interface server 106, and/or the logging library 108. Depending on the embodiment, the method 600 may include fewer or additional blocks and/or the blocks may be performed in an order different than is illustrated.

Beginning at block 602, user input can be received. The user application 122 can receive user input regarding a user interaction. Example user interactions can include a user executing a search, opening a file, creating a file, updating a file, changing a view in a graphical user interface, among others. An example user application is described above with respect to the graphical user interface 408 of FIG. 4A.

At block 604, a logging entry can be determined. The logging entry can be determined based on logging instructions. The logging library 108 can provide an Application Programming Interface (API) that specifies a format for the logging entry. An application developer can embed logging instructions within functions of the user application 122. The logging entry can include: a timestamp associated with the user interaction, a user identifier associated with the user interaction, a category type of the user interaction, an application context associated with the user interaction, the user input, and the system output of the user application. The logging entry details can provide metadata regarding an event, such as when the event occurred, the user associated with the event, the context of the event (such as the application or the application context), a category of the event, user input associated with the event, and system output associated with the event. Example logging details are described in further detail above with respect to the audit logging user interface 300 of FIG. 3.

Example category types can include a broad category for multiple user interactions. The category types can be applied across different user applications. Example category types can include categories related to interactions with data, such as data creation, data deletion, data export, data history (such as user or system events related to the history of data, which can include an action to view an activity log for a resource), data import, data load (such as the loading of data to be returned to a user), data merge (such as combining two data sets into one), data search (such as a search of a resource such as a data set or data object), data update, data transform, or data share (such as the sharing of data from one user to another or changing the access control lists associated with a resource).

Additional example category types can include user-centric categories. Example user-centric categories can include categories for authentication (such as actions related to a user authenticating with a user application), a decision (such as user-driven events in which the user is prompted a course of action and makes a decision response), a login or logout, user navigation (such as a user visiting a page or user interface), viewing data, or a user work context. A user work context can relate to events that edit the user's operating context, such as changes in user's use case. Additional details regarding changing work contexts and/or use cases can be described in greater detail in U.S. patent application Ser. No. 16/023,397 entitled "Controlling Access to Computer Resources" filed Jun. 29, 2018 (the "'397 application"), which is hereby incorporated by reference in its entirety. For example, the '397 application describes work contexts and/or use cases in at least paragraphs [0049]-[0132], among others. Additional example category types can include management categories. Example management categories can include administrative related events or actions, such as management of groups, management of passwords, system management (such as changes to configuration files), or user management (such as the addition, deletion, or modification of user profiles).

Example logging instructions are provided in the below Table 1 that includes pseudocode. The pseudocode may not correspond to any particular programming language. As indicated in Table 1, the logging can occur while the user application is executing. The logging pseudocode can also use an API of the logging library 108.

TABLE 1

```
method(input) {
    <method logic to perform some action>
    methodResult result;
    logger.addLog(category)
        .addUser(identifier)
        .addContext(Context.builder( )
            .name("Example Investigation")
            .id(anotherIdentifier)
            .build( )
        )
        .addSession(yetAnotherIdentifier)
        .addInput(input)
        .addResult(result);
    return result;
}
```

In some embodiments, the logging library 108 can enhance the logging entry. The logging library 108 can retrieve additional data for the logging entry where the user application 122 does not have access to the additional data. For example, the logging entry can include an identifier (such as an object identifier) and the application 122 can execute a query to retrieve additional data for the identifier (such as a textual data, e.g., title or name, for the data object corresponding to the object identifier). The logging library 108 can add the additional data to the logging entry. However, in some embodiments, there may be performance considerations in enriching data, since the enrichment may occur synchronously while the user application is running. Thus, in some embodiments, configuration data may specify a level of logging detail or other logging configuration for the logging entries.

A logging configuration, such as a logging level, can be specified by the application generating the logs. The logging library 108 can receive a logging configuration (such as a logging level) for the application (such as an application user interface). The logging configuration (such as a logging level) can be specified by an administrator. Example logging levels can be defined via a semantic categorization, for example, to include all metadata associated with accessed resources or to include all access control information. The inclusion of no additional data may be the default and may include basic details such as such as when the event occurred, the user associated with the event, the context of the event (such as the application or the application context), a category of the event, user input associated with the event, and system output associated with the event. The logging library 108 can determine that a current logging level corresponds to an enhanced logging level, such as one including metadata or even full data content. Accordingly, in response to the determination, the logging library 108 can log additional data, such as additional textual data (e.g., titles or names of objects).

Example logging configuration types can include (i) a metadata configuration, (ii) an access control configuration, (iii) a content configuration, (iv) a content metadata configuration, or (v) a change difference configuration. The metadata configuration can correspond to a configuration that indicates whether metadata, such as a type, title, identifier, etc., of a resource (such as a data object or dataset) should be logged. The access control configuration can correspond to a configuration that indicates whether access information, such as restrictions on the content associated with a resource and/or restrictions related to who can see the content, should be logged. The content configuration can correspond to a configuration that indicates whether the substance of a resource, such as the row data in a table, the properties on an object, etc., should be logged. The content metadata configuration can correspond to a configuration that indicates whether metadata associated with content of a resource, such as user markup of a document, should be logged. The change difference configuration can correspond to a configuration that indicates whether to log the state of a resource before or after some action.

Example logging configurations are provided in the below Table 2 that includes pseudo-configuration. The pseudo-configuration may not correspond to any particular data format. In the logging configurations of Table 2, a particular configuration being set to "true" can indicate that an enhanced logging level should be used for the particular configuration type.

TABLE 2

```
{
loggingConfiguration:
    logMetadata: true # whether to log metadata of resources
    logAccessControls: false # whether to log access control
information of resources
    logContent: false # whether to log substance of a
resource
    logContentMetadata: false # whether to log metadata for
content of a resource
    logChangeDifferences: false # whether to log the
before/after state of an item
}
```

At block 606, the logging entry can be stored. For example, the logging library 108 can store the logging entry in the logging database 110. In some embodiments, the user computing device 102 can initially store a logging entry to a local data store of the user computing device 102. At a later time, the logging entry can be transferred to and/or re-ingested by the logging database 110. The logging entry can be stored in a structured format, such as a JSON data format. A visual representation of a structured format is shown and described above in further detail with respect to the breakdown user interface area 304 of FIG. 3. An advantage of the structured format for the logging entry can include providing the ability for a reviewer to audit the logging entries by querying and/or filtering on structured aspects of the data, such as querying on particular input, output, or data objects. In some embodiments, storing the logging entry can occur asynchronously. For example, a logging entry can be added to a queue, and a logging service can process the queue to store logging entries in the logging database 110. Thus, the storage of logging entries may not have an impact on the performance of the user application.

At block 608, the system output can be caused. The user application 122 can cause the system output. The system output can be in response to the user input. For example, a user can conduct a search and the system output may be a set of data objects. The set of data objects can be presented to the user in the user application 122. Thus, the logging entry can capture that an event occurred and the logging entry can also include the input and output for the event.

At block 610, the logging entry can be presented. For example, the user interface server 106 can present the logging entry in an audit logging user interface. The audit logging user interface can include a visual representation of one or more log entries. Each visual representation of the logging entry can include the timestamp, user data associated with the user identifier, the category type, context data associated with the application context, the user input, and the system output. Example audit logging user interfaces that present a logging entry or logging entry related data are described in further detail above with respect to FIGS. 2, 3, 4B, 4C, and 5. Context data can include the context of the user application, such as a type of context (such as the general type of user application) or configuration parameters associated with the context of the user application.

Figure 7:
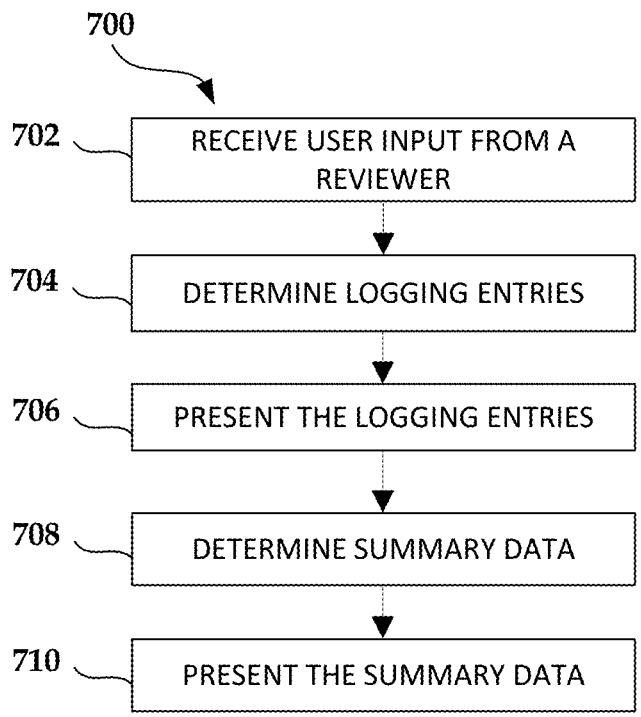
FIG. 7 is a flowchart of an example method of logging entry presentation, according to some embodiments of the present disclosure.

FIG. 7 is a flowchart of an example method 700 of logging entry presentation, according to some embodiments of the present disclosure. Although the method 700 is described in conjunction with the systems of FIG. 1, any system configured to perform the method, in any order, is within the scope of this disclosure. The method 700 may be performed by the various components of the audit logging database system 100 of FIG. 1 as discussed herein, including the user interface server 106. Depending on the embodiment, the method 700 may include fewer or additional blocks and/or the blocks may be performed in an order different than is illustrated.

Beginning at block 702, user input from a reviewer can be received. For example, the user interface server 106 can receive user input from the reviewer computing device 112. The user input can be used to select logging entries. For example, the user input can specify a particular source of logging entries, such as a particular application or service. The user input can specify other search or filtering criteria, which is described in further detail above with respect to FIG. 2. The user input can identify one or more resources that have a relation with particular logging entries, as described herein, such as with respect to FIGS. 4A and 4B. In some embodiments, the user input can include a selection of a particular report, summary user interface, or analytics criteria.

In some embodiments, the reviewer may be authenticated. For example, a reviewer may have particular access control rights. The access control rights may indicate that a reviewer has access to certain logs and/or related data. Thus, a reviewer may be prohibited from reviewing their own log data.

At block 704, the logging entries can be determined. The user interface server 106 can determine logging entries based on the user input. For example, the user input can include a user selection of a particular application. Thus, the user interface server 106 can retrieve logging entries from the logging database 110 that are from the particular application. As described herein, the logging entries can be determined based on search or filtering criteria.

At block 706, the logging entries can be presented. The block 706 may be similar to the block 610 for presenting logging entries described above with respect to FIG. 6.

At block 708, summary data can be determined. The user interface server 106 can determine summary data. The summary data can be based on a statistical measure. For example, a user can select a particular user interface that includes a visualization that uses the statistical measure. For example, a timeline visualization (such as the visualization 212 described above in further detail with respect FIG. 2) can indicate a statistical measure to count the number of logging entries per month or day of the month. As another example, a group by user interface (which can correspond to the summary data 462 described above in further detail with respect to FIG. 4C), can indicate a statistical measure to count the number of logging entries per user. Additional statistical measures can relate to counts of objects related to logging entries. Additional example statistical measures can include a mean, median, mode, range, or standard deviation, for example.

The user interface server 106 can calculate a statistical indicator from the statistical measure. For example, user interface server 106 can calculate the statistical indicator (such as a count or average) for the determined logging entries. Thus, the summary data can indicate analytics on the logging entries, such as a timeline of logging entries generated per day or month, a quantity of logging entries per user, or a quantity unique data objects that are associated with particular logging entries. Additional details regarding summary data and/or analytics are described in further detail above with respect to FIG. 5.

At block 710, the summary data can be presented. The summary data can include the statistical indicator, such as a count or average numerical value calculated from the logging entries. The user interface server 106 can present summary data in a visual format. For example, summary data can include numerical values, which can be presented. The summary data can also be converted into a visualization, such as, but not limited to, a chart, a graph, a bar chart. Example presentation of summary data is described in further detail above with respect to FIGS. 2, 4C, and 5.

Figure 8:
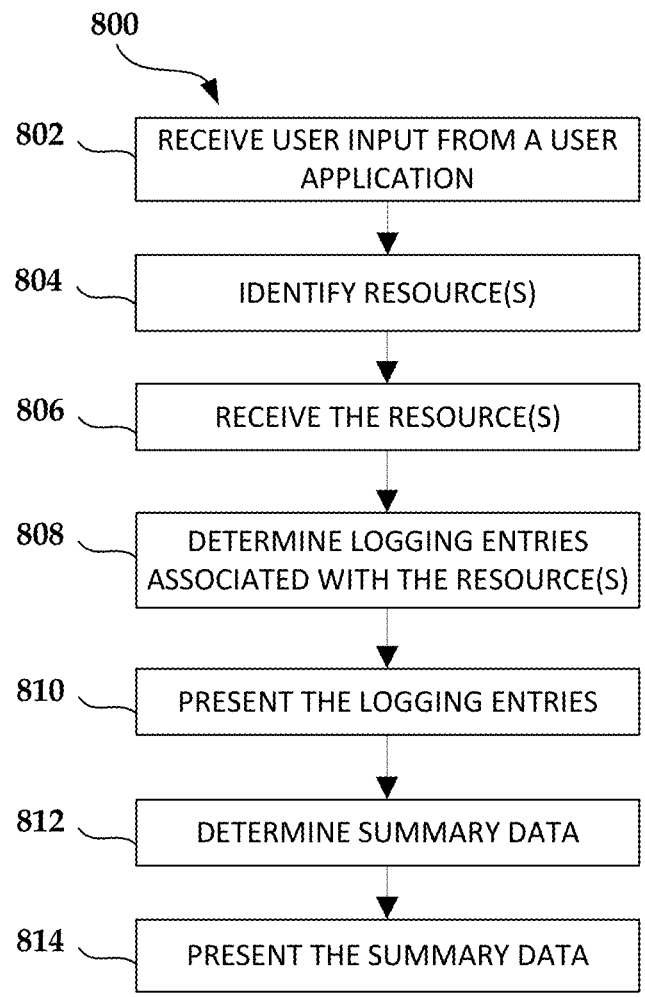
FIG. 8 is a flowchart of an example method of an audit logging workflow, according to some embodiments of the present disclosure.

FIG. 8 is a flowchart of an example method 800 for an audit logging workflow, according to some embodiments of the present disclosure. Although the method 800 is described in conjunction with the systems of FIG. 1, any system configured to perform the method, in any order, is within the scope of this disclosure. The method 800 may be performed by the various components of the application server 120 or the audit logging database system 100 of FIG. 1 as discussed herein, including the user application 122 and/or the user interface server 106. Depending on the embodiment, the method 800 may include fewer or additional blocks and/or the blocks may be performed in an order different than is illustrated.

Beginning at block 802, user input from a user application can be received. The user application 122 can receive user input provided from a reviewer. The user application 122 can include a graphical user interface. An example user application 122 can include an investigation user interface, such as the graphical user interface 400 of FIG. 4A. The user input can specify search or filter criteria to identify one or more resources. For example, the user input can include textual data, such as the name of a person or object.

At block 804, one or more resources can be identified. The user application 122 can identify one or more resources based on the user input. For example, the user input can include search criteria to search for one or more resource(s), such as a data object. In some embodiments, the user application 122 can further identify objects related to a first data object according to an ontology as described herein. For example, multiple objects are identified in the graphical user interface 400 of FIG. 4A. In some embodiments, the one or more resources, such as a data object, can be presented in a user interface, such as the investigation user interface 400 of FIG. 4A.

At block 806, the one or more resources can be received. For example, a reviewer can select one or more of the resources for further review in an audit logging user interface. As described in further detail above with respect to FIGS. 4A and 4B, a reviewer can select some of the identified resources and provide them to the audit logging user interface, such as via a drag and drop user interaction. The user interface server 106 can receive the selected resource(s).

At block 808, logging entries can be determined from the resource(s). The user interface server 106 can determine those logging entries that are related to the resource(s). For example, the logging entries can include identifiers and the user interface server 106 can identify those logging entries with corresponding identifiers (such as data object identifiers). A set of logging entries can be determined where each logging entry from the set of logging entries includes at least a reference to a selected resource (such as by having a corresponding identifier). As another example, the user interface server 106 can search logging entries based on the names or titles of the resources, such as by textually comparing the names or titles of the resources with textual data in the logging entries. A reviewer can specify whether the user interface server 106 should use identifiers and/or names or titles for identifying related logging entries. Thus, the user interface server 106 can identify those logging entries related to the resource(s) identified in the previous user application. The reviewer can perform an audit of all the users that have interacted with particular resources.

At block 810, the logging entries can be presented. The user interface server 106 can present the logging entries associated with the one or more resources. As mentioned above, the reviewer can perform an audit of the users that have interacted with particular resources by reviewing the logging entries in an audit logging user interface. The block 810 may be similar to the presentation blocks 610, 706 of FIGS. 6 and 7, respectively.

At block 812, summary data can be determined. The user interface server 106 can determine summary data of the determined logging entries. For example, the user interface server 106 can determine a statistical measure regarding a number of users that interacted with the identified resource(s). The block 812 can be similar to the summary data block 708 of FIG. 7.

At block 814, the summary data can be presented. The user interface server 106 can present the summary data in an audit logging user interface. The block 814 can be similar to the presentation of summary data block 710 of FIG. 7.

In some embodiments, the auditing workflow of the method 800 can be reversed. The method 700 can include additional blocks, such that identifying and/or presenting one or more log entries, a reviewer can review resources related to a logging entry in a user application. For example, a reviewer can review a particular logging entry for an investigation user interface that a user was looking at a particular data object. In some embodiments, the reviewer can select the data object in the logging entry of the audit logging user interface to open the particular data object in a user application.

Object-Centric Data Model

To provide a framework for the specific systems and methods described herein, an example database system 910 using an ontology 905 will now be described. This description is provided for the purpose of providing an example and is not intended to limit the techniques to the example data model, the example database system, or the example database system's use of an ontology to represent information.

In some embodiments, a body of data is conceptually structured according to an object-centric data model represented by ontology 905. The conceptual data model is independent of any particular database used for durably storing one or more database(s) 909 based on the ontology 905. For example, each object of the conceptual data model may correspond to one or more rows in a relational database or an entry in Lightweight Directory Access Protocol (LDAP) database, or any combination of one or more databases.

Figure 9:
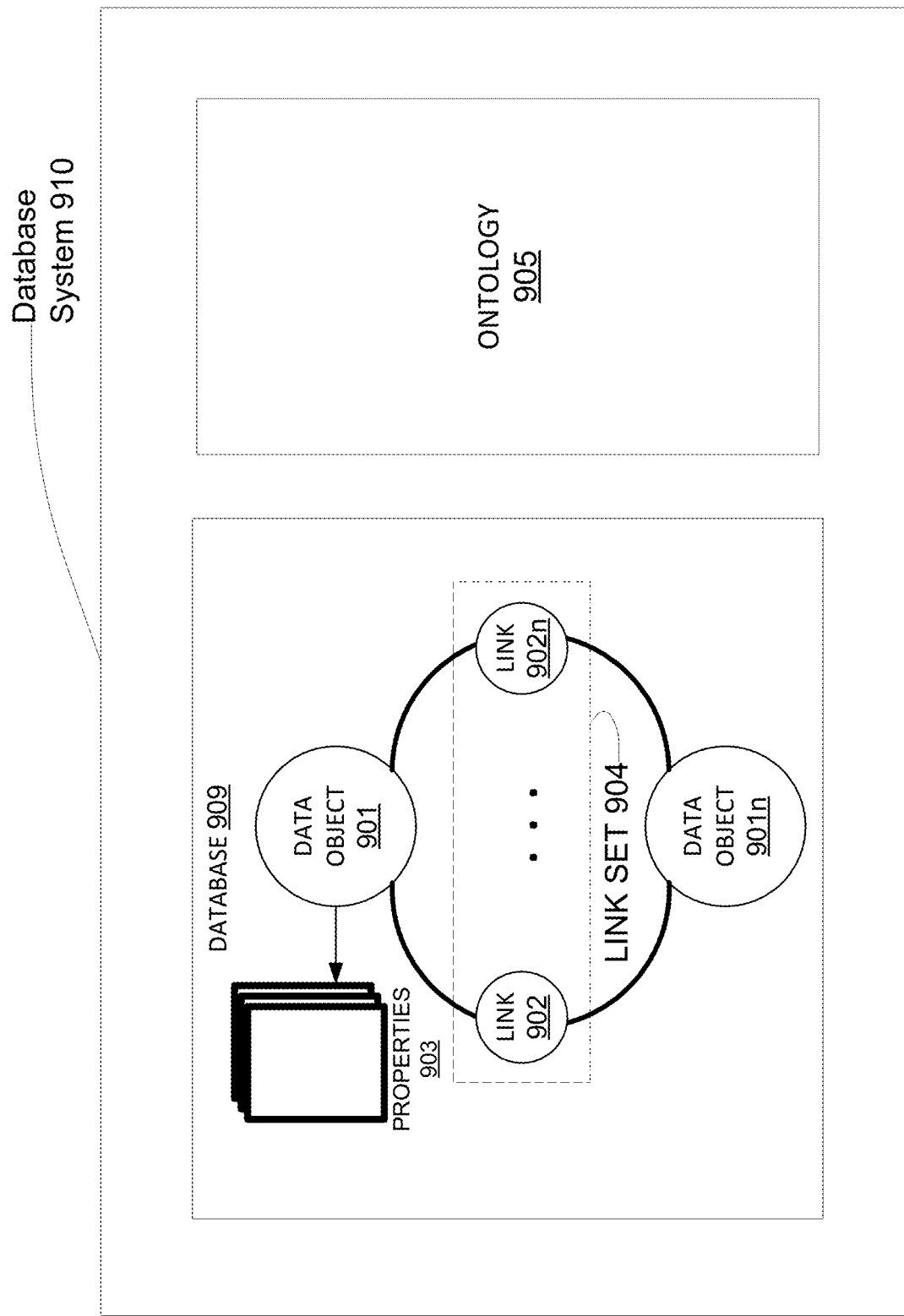
FIG. 9 illustrates a database system using an ontology, according to some embodiments of the present disclosure.

FIG. 9 illustrates an object-centric conceptual data model according to an embodiment. An ontology 905, as noted above, may include stored information providing a data model for storage of data in the database 909. The ontology 905 may be defined by one or more object types, which may each be associated with one or more property types. At the highest level of abstraction, the data object 901 is a container for information representing things in the world. For example, the data object 901 can represent an entity such as a person, a place, an organization, a market instrument, or other noun. The data object 901 can represent an event that happens at a point in time or for a duration. The data object 901 can represent a document or other unstructured data source such as an e-mail message, a news report, or a written paper or article. Each data object 901 is associated with a unique identifier that uniquely identifies the data object within the database system.

Different types of data objects may have different property types. For example, a "Person" data object might have an "Eye Color" property type and an "Event" data object might have a "Date" property type. Each property 903 as represented by data in the database system 910 may have a property type defined by the ontology 905 used by the database 905.

Objects may be instantiated in the database 909 in accordance with the corresponding object definition for the particular object in the ontology 905. For example, a specific monetary payment (e.g., an object of type "event") of US$30.00 (e.g., a property of type "currency") taking place on Mar. 27, 2018 (e.g., a property of type "date") may be stored in the database 909 as an event object with associated currency and date properties as defined within the ontology 905. The data objects defined in the ontology 905 may support property multiplicity. In particular, a data object 901 may be allowed to have more than one property 903 of the same property type. For example, a "Person" data object might have multiple "Address" properties or multiple "Name" properties.

Each link 902 represents a connection between two data objects 901. In some embodiments, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In some embodiments, when two data objects are connected by an event, they are also connected by relationships, in which each data object has a specific relationship to the event, such as, for example, an "Appears In" relationship.

As an example of a corresponding properties connection, two "Person" data objects representing a brother and a sister, may both have an "Address" property that indicates where they live. If the brother and the sister live in the same home, then their "Address" properties likely contain similar, if not identical property values. In some embodiments, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 901 can have multiple links with another data object 901 to form a link set 904. For example, two "Person" data objects representing a husband and a wife could be linked through a "Spouse Of" relationship, a matching "Address" property, and one or more matching "Event" properties (e.g., a wedding). Each link 902 as represented by data in a database may have a link type defined by the database ontology used by the database.

Implementation Mechanisms

The various computing device(s) discussed herein, such as the audit logging database system 100, the user interface server 106, the application server 120, the reviewer computing device 112, and/or the user computing device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The audit logging database system 100 may be hosted and/or executed on one or more computing devices with one or more hardware processors and with any of the previously mentioned operating system software.

Figure 10:
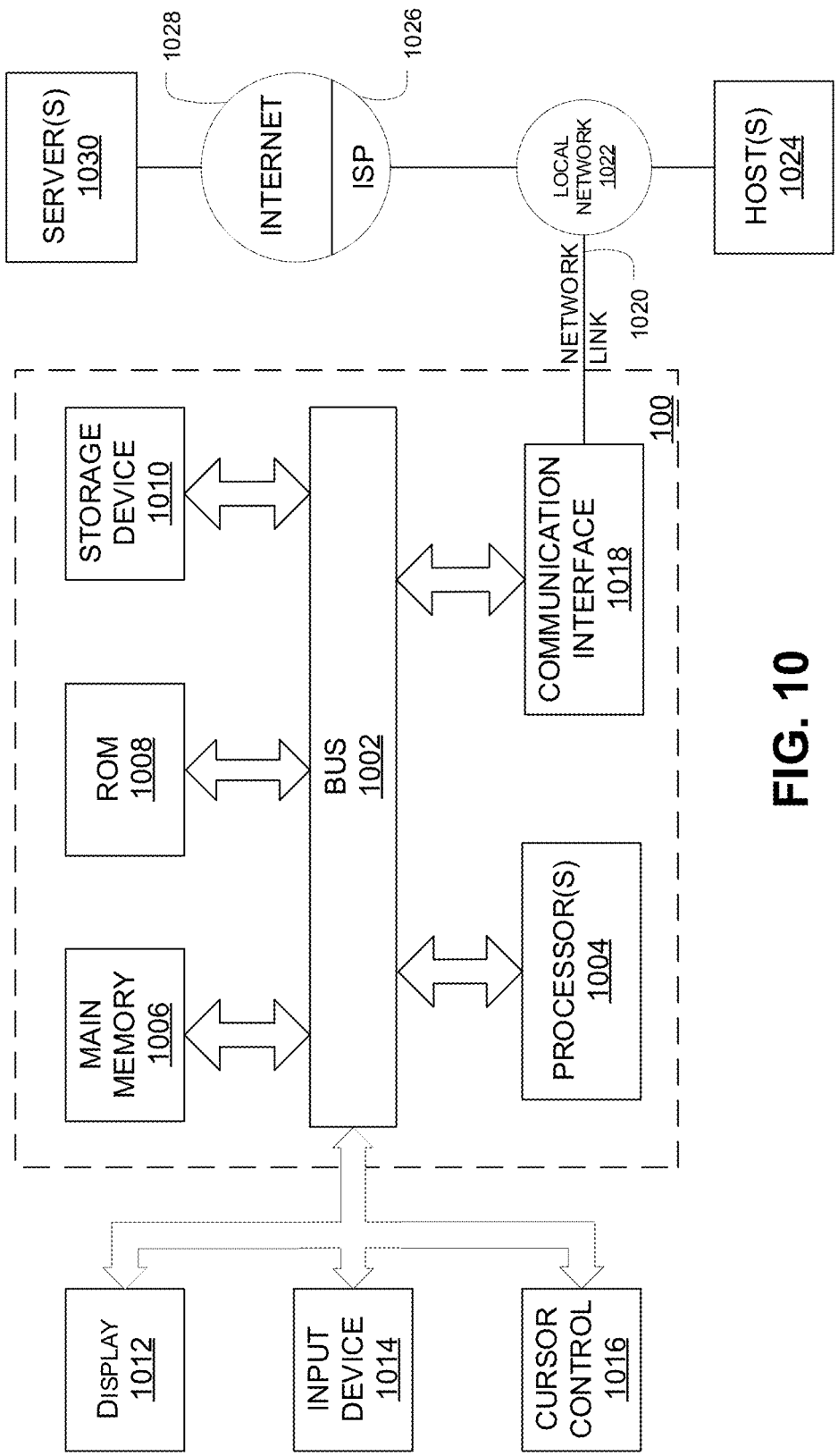
FIG. 10 is a block diagram illustrating an example audit logging database system with which various methods and systems discussed herein may be implemented.

FIG. 10 is a block diagram that illustrates example components of the audit logging database system 100. While FIG. 10 refers to the audit logging database system 100, any of the other computing devices, modules, services, and/or user computing devices discussed herein may have some or all of the same or similar components.

The audit logging database system 100 may execute software, e.g., standalone software applications, applications within browsers, network applications, etc., whether by the particular application, the operating system, or otherwise. Any of the systems discussed herein may be performed by the audit logging database system 100 and/or a similar computing system having some or all of the components discussed with reference to FIG. 10.

The audit logging database system 100 includes a bus 1002 or other communication mechanism for communicating information, and a hardware processor, or multiple processors, 1004 coupled with bus 1002 for processing information.

The audit logging database system 100 also includes a main memory 1006, such as a random access memory (RAM), cache and/or other dynamic storage devices, coupled to bus 1002 for storing information and instructions to be executed by processor(s) 1004. Main memory 1006 also may be used for storing temporary variables or other intermediate information during execution of instructions to be executed by processor(s) 1004. Such instructions, when stored in storage media accessible to processor(s) 1004, render the audit logging database system 100 into a special-purpose machine that is customized to perform the operations specified in the instructions. Such instructions, as executed by hardware processors, may implement the methods and systems described herein for generating and/or executing efficient queries.

The audit logging database system 100 further includes a read only memory (ROM) 1008 or other static storage device coupled to bus 1002 for storing static information and instructions for processor(s) 1004. A storage device 1010, such as a magnetic disk, optical disk, or flash drive, etc., is provided and coupled to bus 1002 for storing information and instructions. The logging library 108 and/or the user application 122 of FIG. 1 may be stored on the main memory 1006 and/or the storage device 1010.

The audit logging database system 100 and/or user computing device 102 may be coupled via bus 1002 to a display 1012, such as a LCD display or touch screen, for displaying information to a computer user. An input device 1014 is coupled to bus 1002 for communicating information and command selections to processor 1004. One type of input device 1014 is a keyboard including alphanumeric and other keys. Another type of input device 1014 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The audit logging database system 100, or components of it, such as the user interface server 106 and/or the logging library 108 of FIG. 1, may be programmed, via executable code instructions, in a programming language. The application server 122, or components of it, such as the user application 122 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Bus 1002 carries data to main memory 1006, from which the processor(s) 1004 retrieves and executes the instructions. The instructions received by main memory 1006 may retrieve and execute the instructions. The instructions received by main memory 1006 may optionally be stored on storage device 1010 either before or after execution by computer hardware processor(s) 1004.

The audit logging database system 100 also includes a communication interface 1018 coupled to bus 1002. Communication interface 1018 provides a two-way data communication coupling to a network link 1020 that is connected to a local network 1022. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from the audit logging database system 100, are example forms of transmission media.

A network, such as the network 160 of FIG. 1, may comprise, but is not limited to, one or more local area networks, wide area network, wireless local area network, wireless wide area network, the Internet, or any combination thereof.

The audit logging database system 100 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor(s) 1004 as it is received, and/or stored in storage device 1010, or other non-volatile storage for later execution.

In some embodiments, the audit logging database system 100 and/or the user computing device 102 may operate in a distributed computing environment including several computer systems that are interconnected using one or more computer networks. The audit logging database system 100 and/or the user computing device 102 could also operate within a computing environment having a fewer or greater number of devices than are illustrated in FIG. 1 and/or FIG. 10. Thus, the depiction of audit logging database system 100 and/or the user computing device 102 in FIG. 1 and/or FIG. 10 should be taken as illustrative and not limiting to the present disclosure. For example, the audit logging database system 100 and/or the user computing device 102 could implement various Web services components and/or peer-to-peer network configurations to implement at least a portion of the processes described herein. For example, multiple servers and/or processes may process and/or analyze items and/or present a user interface in a distributed manner, as described herein.

While the present disclosure often discusses audit logging in the context of user interactions, the systems and methods described herein may be applied to other types of events. For example, a process starting or rebooting can be logged by the audit logging database system 100.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for audit logging user interactions, the method comprising:
   receiving a first logging configuration for an application user interface;
   determining, from the first logging configuration, to log an additional data field in addition to a default set of data fields;
   receiving user input regarding a user interaction with the application user interface;
   determining:
      a timestamp associated with the user interaction,
      a user identifier associated with the user interaction,
      a category type of the user interaction,
      an application context associated with the user interaction,
      an object identifier associated with a first data object and the user interaction,
      system output of the application user interface, the system output in response to the user input;
   in response to determining to log the additional data field from the first logging configuration, retrieving the additional data field from the first data object using the object identifier;
   generating a first logging entry for the user interaction, the first logging entry comprising: the timestamp, the user identifier, the category type, the application context, the user input, the system output, and the additional data field for the first data object;
   storing the first logging entry in a structured format to a non-transitory computer storage medium; and
   causing the system output of the application user interface.

2. The method of claim 1, further comprising:
   retrieving, from the non-transitory computer storage medium, a plurality logging entries comprising the first logging entry; and
   causing presentation, in an audit logging user interface, of the plurality logging entries, wherein the presentation of the first logging entry comprises a visual representation of:
      the timestamp,
      user data associated with the user identifier,
      the category type of the user interaction,
      context data associated with the application context,
      the user input,
      the system output, and
      the additional data field for the data object.

3. The method of claim 2, further comprising:
   receiving a statistical measure;
   calculating a statistical indicator from at least some logging entries of the plurality logging entries according to the statistical measure; and
   causing presentation, in the audit logging user interface, of summary data comprising the statistical indicator.

4. The method of claim 1, wherein the system output comprises the first data object.

5. The method of claim 4, further comprising:
   receiving second user input regarding a second user interaction with an investigation user interface;
   identifying the first data object based at least in part on the second user input;
   causing presentation, in the investigation user interface, of the first data object;
   receiving, by an audit logging user interface, a selection of the first data object from the investigation user interface;
   determining a second plurality of logging entries, wherein each logging entry of the second plurality of logging entries comprises at least a reference to the first data object, the second plurality of logging entries comprising the first logging entry; and
   causing presentation, in the audit logging user interface, of the second plurality of logging entries.

6. The method of claim 5, wherein the selection of the first data object comprises a drag and drop user interaction from the investigation user interface to the audit logging user interface.

7. The method of claim 5, further comprising:
causing presentation, in the audit logging user interface, of summary data regarding the second plurality of logging entries.

8. The method of claim 7, wherein the summary data comprises a statistical measure regarding a number of users that interacted with the first data object.

9. A system comprising:
a non-transitory computer storage medium; and
one or more computer hardware processors in communication with the non-transitory computer storage medium, the one or more computer hardware processors configured to execute the computer-executable instructions to at least:
receive a first logging configuration for an application;
determine, from the first logging configuration, to log an additional data field in addition to a default set of data fields;
receive user input regarding a user interaction with the application;
determine:
a timestamp associated with the user interaction,
a user identifier associated with the user interaction,
a category type of the user interaction,
an application context associated with the user interaction,
an object identifier associated with a first data object and the user interaction,
and
system output of the application, the system output in response to the user input;
in response to determining to log the additional data field from the first logging configuration, retrieve the additional data field from the first data object using the object identifier;
generate a first logging entry for the user interaction, the first logging entry comprising: the timestamp, the user identifier, the category type, the application context, the user input, the system output, and the additional data field for the first data object;
store the first logging entry in a structured format to the non-transitory computer storage medium; and
causing the system output of the application.

10. The system of claim 9, wherein the one or more computer hardware processors are further configured to:
retrieve, from the non-transitory computer storage medium, a plurality logging entries comprising the first logging entry; and
cause presentation, in an audit logging user interface, of the plurality logging entries, wherein the presentation of the first logging entry comprises a visual representation of:
the timestamp,
user data associated with the user identifier,
the category type of the user interaction,
context data associated with the application context,
the user input,
the system output, and
the additional data field for the data object.

11. The system of claim 10, wherein the one or more computer hardware processors are further configured to:
receive a statistical measure;
calculate a statistical indicator from at least some logging entries of the plurality logging entries according to the statistical measure; and
cause presentation, in the audit logging user interface, of summary data comprising the statistical indicator.

12. The system of claim 9, wherein the system output comprises a first resource.

13. The system of claim 12, wherein the one or more computer hardware processors are further configured to:
receive second user input regarding a second user interaction with a second application;
identify the first resource based at least in part on the second user input;
receive, by an audit logging user interface, a selection of the first resource from the second application;
determine a second plurality of logging entries, wherein each logging entry of the second plurality of logging entries comprises at least a reference to the first resource, the second plurality of logging entries comprising the first logging entry; and
cause presentation, in the audit logging user interface, of the second plurality of logging entries.

* * * * *